Sept. 12, 1939.  F. L. VAN WEENEN  2,172,812
DEVICE FOR FEEDING FILMS
Filed Feb. 9, 1939

INVENTOR
F. L. van Weenen
BY
C. F. Nimmoth
ATTORNEY

Patented Sept. 12, 1939

2,172,812

UNITED STATES PATENT OFFICE 2,172,812

DEVICE FOR FEEDING FILMS

Franciscus Lambertus Van Weenen, Eindhoven, Netherlands, assignor to N. V. Philips' Gloeilampenfabrieken, Eindhoven, Netherlands Application February 9, 1939, Serial No. 255,533
In Germany May 31, 1938

3 Claims. (Cl. 271—2.3)

My invention relates to a device for feeding films, particularly motion picture films, which are provided with sprocket perforations along one edge.

For this purpose it is the general practice to use a driving roller provided at one side with a row of teeth and on the other side with a stationary guide surface so that the film may be slipped over the roller from only one side. As the film is applied from the side remote from the side at which the teeth are located, such a roller is suitable only for films of a predetermined width. Furthermore, as only the non-sensitized surface of the film may be in contact with the surface of the roller, the roller is unsuitable for films which have the perforation holes along the opposite edge.

The main object of my invention is to overcome the above difficulties.

A further object is to provide a construction in which the film may be readily applied to the roller.

A still further object is to provide a construction with which films having perforations along either edge can be used.

Another object is to prevent the film from leaving the roller during operation.

Further objects and advantages will appear from the following description.

In accordmance with the invention I use a roller provided along the edge at which the film is applied with a guide flange and a row of teeth. Furthermore, I provide a stationary guiding member having a guiding surface which forms with the peripheral surface of the flange a slit through which the film is inserted and which has a width at least equal to the width of the film, and a retaining surface which extends parallel to the axis of the roller and forms with the smooth surface thereof a slit whose width is equal to at least twice the thickness of the film.

Figure 1:
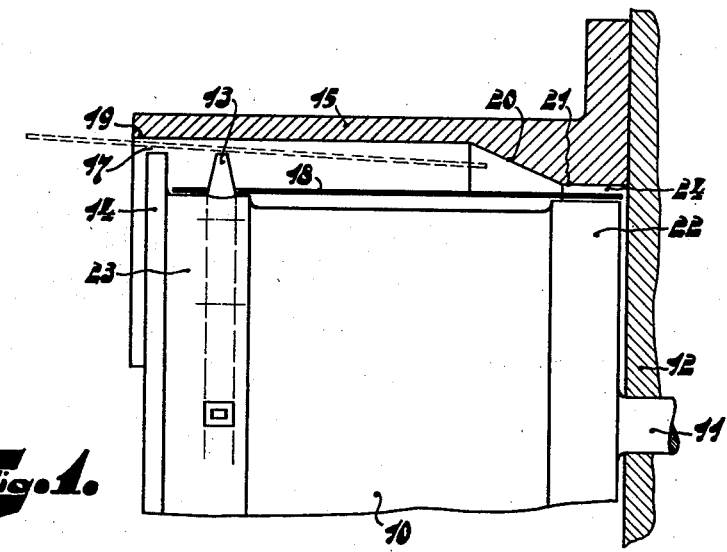
Figure 2:
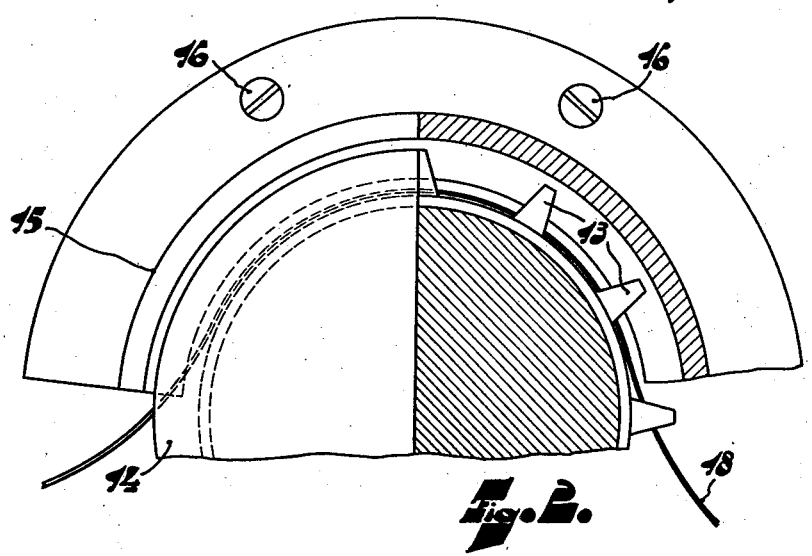
Figure 3:
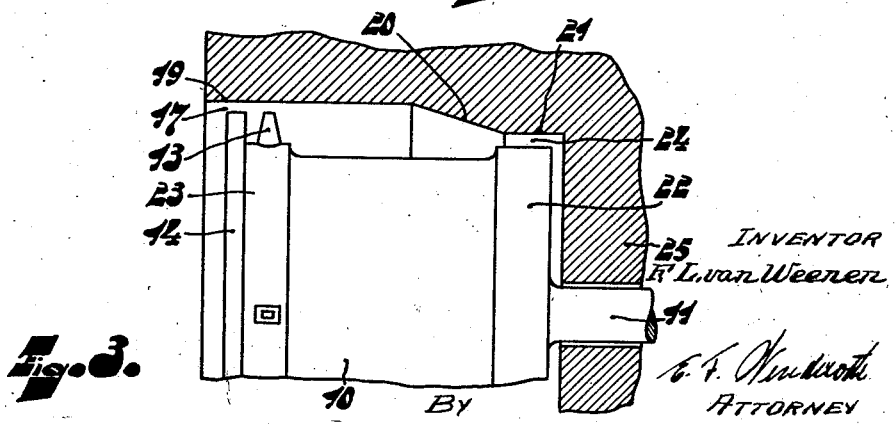

In order that the invention may be clearly understood and readily carried into effect, I shall describe the same in more detail with reference to the accompanying drawing in which, Fig. 1 is a sectional view of a portion of a motion picture camera embodying a feeding device according to the invention, Fig. 2 is a partly sectionized side view of Fig. 1, and Fig. 3 is a sectional view of a motion picture camera having a feeding device according to another embodiment of the invention.

As shown in Figures 1 and 2 a roller 10 is mounted on a shaft 11 rotatably supported by a portion 12 of the housing of the camera and rotated by a suitable mechanism (not shown). Roller 10 is provided at one end with a flange 14 and a shoulder 23 provided with a row of teeth 13, and on its other end with a smooth surfaced shoulder 22. A film 18 rests upon the surfaces of shoulders 22 and 23 with its perforation holes engaging the teeth 13, and is guided laterally by the inner side of flange 14.

Secured to housing 12 by means of screws 16 and extending partly around roller 10 is a guiding member 15. Member 15 has a cylindrical surface portion 19 which forms with the peripheral surface of flange 14 an annular slit 17 whose width is at least equal to the thickness of the film 18, a conical surface portion 20, and a cylindrical retaining surface portion 21 which forms with the peripheral surface of shoulder 22 an annular slit 24 whose width is at least twice the thickness of film 18.

The film 18 is inserted through slit 17 so as to occupy the position indicated in dotted lines in Figure 1, and to allow for this the distance between the addendum circle of the teeth 13 and the surface 19 must be at least equal to the thickness of the film. Upon further movement of film 18 the right hand end thereof is guided by surface 20 into slit 24. The width of slit 24 is at least equal to twice the thickness of the film in order to permit the passage of lapped splices therein. When the film is stretched the perforation holes engage teeth 23 and at the same time the left hand edge of the film is located near the inner surface of flange 14; which surface guides the film laterally and prevents damage of the perforation holes by the teeth 13.

The diameter of the addendum circle of teeth 13 may, of course, be made smaller than the diameter of the peripheral surface of flange 14, however, as it is necessary to maintain a minimum distance equal to the thickness of the film between the surface of the flange 14 and the surface 19. I prefer to make these diameters the same as in such cases the width of the space between the roller 10 and the inner surface of member 15 may be made smaller and a more correct positioning of the film is ensured. The film is removed in the reverse order.

It should be noted that the film cannot accidently spring out of engagement with the teeth 13 because the surface 21 prevents the film from lifting to any appreciable amount from the surfaces of shoulders 22 and 23.

The construction illustrated in Figure 3 is similar to that of Figures 1 and 2 and has similar parts indicated by the same reference numeral. However, in Figure 3 the guiding member forms part of the housing indicated by reference numeral 25. As shaft 11 is journalled in the housing 25, the surfaces 19, 20 and 21 can be made exactly concentric with the axis of the roller. For this purpose these surfaces may be cut by a suitable boring tool which is centered in the journal of shaft 11.

While I have described my invention in connection with specific applications and examples, I do not wish to be limited thereto but desire the appended claims to be construed as broadly as is permissible in view of the prior art.

What I claim is:

1. A film feeding device comprising a support, a roller mounted at one end on said support and having a flanged portion at the opposite end, and a smooth-faced portion adjacent the support and of smaller diameter than the flange portion, a row of teeth adjacent said flange portion, and means for guiding the film onto the roller and retaining the same in place thereon comprising a member partly surrounding said roller with an intermediate space and abutting against said supporting base, said member having a surface portion forming a narrow annular slit with the peripheral surface of said flange portion, and a second surface portion of smaller diameter than the first portion forming an annular slit with the surface of the smooth-faced portion.

2. A film feeding device comprising a support, a roller mounted at one end on said support and having a flanged portion at the opposite end, and a smooth-faced portion adjacent the support and of smaller diameter than the flange portion, a row of teeth adjacent said flange portion, and means for guiding the film onto the roller and retaining the same in place thereon, said means comprising a member partly surrounding said roller with an intermediate space and abutting against said supporting base, said member having a surface portion forming with the peripheral surface of said flange portion an annular slit of a thickness at least equal to the thickness of the film and a second surface portion of smaller diameter than the first portion forming with the surface of the smooth faced portion an annular slit of a thickness at least twice that of the film.

3. A film feeding device comprising a support, a roller mounted at one end on said support and having a flanged portion at the opposite end, and a smooth-faced portion adjacent the support and of smaller diameter than the flange portion, a row of teeth adjacent said flange portion, the addendum circle of said teeth having a diameter substantially equal to the diameter of said flange portion, and means for guiding the film onto the roller and retaining the same in place thereon, said means comprising a member partly surrounding said roller with an intermediate space and abutting against said support, said member having a surface portion forming a narrow annular slit with the peripheral surface of said flange portion and a second surface portion of smaller diameter than the first portion forming an annular slit with the surface of the smooth-faced portion.

FRANCISCUS LAMBERTUS VAN WEENEN.